United States Patent
Yochum et al.

[15] 3,674,701
[45] July 4, 1972

[54] ACCELERATOR COMPOSITION

[72] Inventors: Daniel William Yochum, Merchantville, N.J.; Paul Gordon Haines, Lafayette Hill; Ivan C. Popoff, Ambler, both of Pa.

[73] Assignee: Pennwalt Corporation, Philadelphia, Pa.

[22] Filed: Feb. 17, 1971

[21] Appl. No.: 116,250

[52] U.S. Cl...............................252/182, 252/431, 252/426, 260/794
[51] Int. Cl.........................................................C08c 11/48
[58] Field of Search...........252/182, 410, 436 N, 426, 431 P; 260/794, 79.5

[56] References Cited

UNITED STATES PATENTS 3,494,900   2/1970   St. Albans et al.....................260/79.5

Primary Examiner—John D. Welsh
Attorney—Stanley Litz and Carl A. Hechmer, Jr.

[57] ABSTRACT

Accelerator compositions having high activity which inhibit surface bloom in vulcanizates are comprised of a mixture of a thiourea of the structure (I).

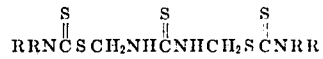

with

II. a polysulfide of the structure

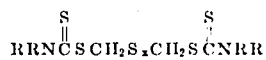

or

III. tetramethyl thiuram disulfide or a mixture thereof with bis-(oxydiethylene)thiuram disulfide, or (IV).

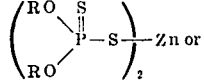

V. the zinc salt of the reaction product of ethanolamine, formaldehyde and carbon disulfide.

5 Claims, No Drawings

ACCELERATOR COMPOSITION

This invention relates to compositions which are active accelerators for the vulcanization of elastomers, and more particularly to an accelerator composition comprising a mixture of a particular thiourea with another sulfur-containing compound, which mixture is especially useful in retarding surface bloom in vulcanized elastomers, especially in elastomeric terpolymers of ethylene, propylene and a diene monomer.

In the process of vulcanization of elastomers using an accelerator with sulfur or other vulcanization agent, there has been a need for a non-blooming type of accelerator that has adequate accelerator activity. The thiurams, such as tetramethyl thiuram disulfide and tetraethyl thiuram disulfide, have high activity as accelerators but they give an undesirable surface bloom on elastomer vulcanizates. Surface bloom is an undesirable phenomenon characterized by the appearance of a coating of solids or oil upon the surface of a vulcanizate as a result of the migration to the surface of one or more of the components of the vulcanized elastomer. This may occur quickly, as for example, in a few days, or not until several months have elapsed. It is particularly a problem in the case of EPDM elastomers, which are terpolymers of ethylene, propylene and a diene monomer, for example, 11-ethyl-1, 11-tridecadiene, 1,5-cyclooctadiene, 1,4-hexadiene, 5-ethylidene-2-norbornene, 5-methylene-2-norbornene, dicyclopentadiene, 2,5-norbornadiene and the like. Moreover, the curing of the EPDM elastomer requires a high activity accelerator because of the low level of unsaturation in the polymer.

This invention provides a bloom-inhibiting accelerator composition comprising a mixture of from about 25 to about 75 weight percent (preferably 25 to 50 wt. percent) of:

I. a thiourea of the structure

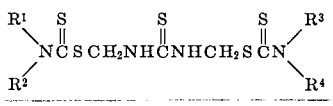

and correspondingly from about 75 to 25 weight percent (preferably 75 to 50 percent) of a sulfur-containing compound selected from the group consisting of:

II. a polysulfide of the structure

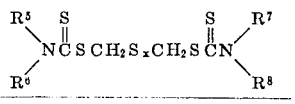

III. tetramethyl thiuram disulfide, or a mixture of tetramethyl thiuram disulfide and bis(oxydiethylene)thiuram disulfide containing at least about 25 percent by weight of the former compound;

IV. a zinc phosphorodithioate of the structure

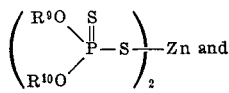

V. the zinc salt of the reaction product of essentially equimolar amounts of ethanolamine, formaldehyde and carbon disulfide;

wherein the above structures $R^1$, $R^2$, $R^3$ and $R^4$ are alkyl having one to eight carbon atoms or phenyl, $R^5$ and $R^7$ are alkyl having one to eight carbon atoms or phenyl, $R^6$ and $R^8$ are alkyl having one to eight carbon atoms, and each of $R^5$, $R^6$, $R^7$ and $R^8$ taken together with the nitrogen atom to which they are attached can form a piperidino, pyrrolidino or morpholino radical, $R^9$ and $R^{10}$ are alkyl having one to eight carbon atoms, and $x$ is an integer of 2 to 6. (Of course, the total of the "I" - component taken with the "II," "III," "IV," or "V" component in the composition will be 100 percent).

The "I" compounds are known, being described in U.S. Pat. No. 2,068,355 to R.L. Sibley. In the preferred embodiments $R^1$, $R^2$, $R^3$ and $R^4$ are alkyl of one to four carbon atoms.

The "II" compounds are described in the copending application of Harry E. Albert, Ser. No. 781,691, filed Nov. 29, 1968, now U.S. Pat No. 3,579,516, herein incorporated by reference. In the preferred embodiments the integer $x$ is 2, and $R^5$, $R^6$, $R^7$ and $R^8$ are alkyl of one to four carbon atoms. Representative polysulfides embodied by the "II" compound designation are Bis[(N,N-dimethylthiocarbamyl)thiomethyl]disulfide
Bis[(N,N-dimethylthiocarbamyl)thiomethyl]tetrasulfide
Bis[(N,N-dimethylthiocarbamyl)thiomethyl]pentasulfide
Bis[(N,N-diethylthiocarbamyl)thiomethyl]disulfide
Bis[(N,N-diethylthiocarbamyl)thiomethyl]trisulfide
Bis[(N,N-diisopropylthiocarbamyl)thiomethyl]disulfide
Bis[(N,N-oxydiethylene thiocarbamyl)thiomethyl]disulfide
Bis[(N,N-pentamethylenethiocarbamyl)thiomethyl]disulfide
Bis[(N,N-tetramethylenethiocarbamyl)thiomethyl]trisulfide
Bis[(N,N-dihexylthiocarbamyl)thiomethyl]disulfide
Bis[(N,N-di-2-ethylhexylthiocarbamyl)thiomethyl]disulfide
Bis[(N,N-dibutylthiocarbamyl)thiomethyl]trisulfide
Bis[(N,N-diisobutylthiocarbamyl)thiomethyl]disulfide
(N,N-Dimethylthiocarbamyl)thiomethyl-(N',N'-Diethylthiocarbamyl)thiomethyl disulfide
Bis[(dialkylthiocarbamyl)thiomethyl]disulfide where alkyl is a mixture of methyl, ethyl and butyl, for example, the product prepared from equimolar amounts of dimethyl-, diethyl-, and dibutylamine Bis[(N-phenyl-N-methylthiocarbamyl)thiomethyl]disulfide
Bis[(N-phenyl-N-ethylthiocarbamyl)thiomethyl]disulfide The "III" compounds, tetramethyl thiuram disulfide, i.e.,

and the mixture of at least 25 percent thereof with bis-(oxydiethylene)thiuram disulfide, i.e.,

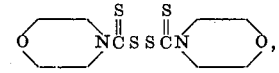

are well known compositions.

The "IV" compounds are known and described in U.S. Pat. No. 3,308,103 to A.Y. Coran and E. Morita, herein incorporated by reference. In the preferred embodiments, $R^9$ and $R^{10}$ are alkyl of three to five carbon atoms and most preferred is zinc O,O-dibutyl phosphorodithioate.

The "V" composition is described in terms of the zinc salt of the reaction product of essentially equimolar amounts of ethanolamine, formaldehyde and carbon disulfide because the molecular structure of said reaction product is not readily ascertainable.

The compositions of this invention, that is, the described mixture of the thiourea I with any of the compositions, II, III, IV or V in the proportions as delineated, are employed as accelerators in the conventional manner in the vulcanization of elastomers, especially of ethylene-propylenediene (EPDM) elastomers. Generally in such vulcanizations from about 0.5 to 5 phr., preferably 1.5 to 4 phr., accelerator are used, generally with from about 0.5 to 3 phr. of sulfur as the vulcanization agent. (phr. means parts per hundred parts by weight of the elastomer). The accelerator composition is milled into the elastomer along with the sulfur, and other optional modifying ingredients, for example, carbon black, stearic acid, zinc oxide, naphthenic oil and others known to the trade. The elastomer is then normally cured (vulcanized) by heating to from about 300° to 450° F. for from about 10 seconds to 1 hour, usually for about 10–40 minutes at about 300°–350° F.

It has been discovered that the mixed accelerators composition of the present invention not only retards blooming in the cured elastomer but also shows increased accelerator activity as demonstrated by a significant increase in elastomer tensile strength and modulus when comparisons are made at equivalent concentrations of accelerators and the same curing conditions. These improved results in acceleration activity and inhibition of blooming are noted for the claimed mixtures of the components compared to the equivalent concentrations of individual components used alone, as confirmed by the data presented hereinafter in Tables 1 – 3. Moreover, it has been found that the improvements are not obtained when thiourea I is mixed with other sulfur-containing compounds which are known accelerators and are similar in structure to the components of the mixture claimed, evidencing the unexpected results of the present invention (as confirmed, for example, by test Nos. 11, 24 and 25 of Table I, and tests 7 and 8 of Table 3). Similarly, improved results are not obtained when other thiourea compounds are substituted for the thiourea I of the present invention (see tests Nos. 29 and 30 of Table I, and tests 12 and 13 of Table 2).

The invention is illustrated and clarified, and the surprising results achieved by its practice are demonstrated, by reference to the following examples in which the preparation of various components is exemplified and the vulcanization evaluations of a representative EPDM elastomer using both claimed and comparative accelerator compositions are carried out. The following recipe is used, where the amounts of ingredients are based on parts by weight per hundred parts of elastomer.

| | Parts by weight |
|---|---|
| EPDM elastomer (ethylene-propylene-dicyclopentadiene terpolymer) | 100 |
| Naphthenic oil | 50 |
| Carbon (FEF) black | 100 |
| Zinc oxide | 5 |
| 2-Mercaptobenzothiazole | 0.5 |
| Stearic acid | 2 |
| Sulfur | variable, 0.5 and 2 |
| Accelerator | variable, 2,3,4 and 5 |

The curing of vulcanizate is carried out at 320° F. removing samples for testing at 5, 10, 20, 30, 40 and 60 minutes intervals.

EXAMPLE 1: PREPARATION OF REPRESENTATIVE COMPOUNDS OF GROUP I

A. At ambient temperature, 324 g. (4.0 moles) 37 percent formaldehyde solution is added to a mechanically stirred mixture of 152 g. (2.0 moles) thiourea, 1,000 ml. water and 517 g. (4.0 moles) dibutylamine. After dropwise addition of 318 g. (4.2 moles) carbon disulfide the reaction mixture is further stirred for 1 hour at elevated temperature (40°–50° C.). After working up the reaction mixture, there are obtained 901 g. of crude product as viscous oil which slowly crystallizes on standing. Recrystallization of a portion of the crude product from chloroform-hexane mixture gives analytically pure product melting at 95°–97° C., i.e., 1,3-bis[(N,N-dibutylthiocarbamyl)thiomethyl]thiourea,

B. Similar reaction of 129 g. (1.0 mole) diisobutylamine in 300 ml. water, 38 g. (0.5 mole) thiourea, 81 g. (1.0 mole) 37 percent formaldehyde solution and 76 g. (1.0 mole) carbon disulfide gives 197 g. of crude product as a viscous oil. Treatment of the crude product with methanol and subsequent crystallization from a benzene-hexane mixture gives a purified product melting at 117°–120° C., 1,3-bis[(N,N-diisobutylthiocarbamyl)thiomethyl]thiourea.

C. 1,3-Bis[(N,N-dialkylthiocarbamyl)thiomethyl]thiourea, where "dialkyl" is mixed dibutyl and dimethyl, is similarly prepared by reacting 2 moles of a mixture of dibutyl and dimethyl amine with 1 mole thiourea, 2 moles formaldehyde and 2.1 moles carbon disulfide, in aqueous media.

D. The same thiourea as in part C is prepared, but with pre-reaction of the amines, formaldehyde and carbon disulfide as a first step, followed by addition of the thiourea as a second step.

EXAMPLE 2: PREPARATION OF REPRESENTATIVE COMPOUND OF GROUP II.

With stirring and moderate cooling, 1.57 moles hydrogen sulfide gas is absorbed in 3 moles of a mixture dimethylamine, diethylamine and dibutylamine; 1.5 moles powdered sulfur is dissolved in the reaction mixture followed by 3 moles paraformaldehyde and then 3.3 moles carbon disulfide. The product is recovered as a brown oil, 1,3-bis[(N,N-dialkylthiocarbamyl)-thiomethyl]disulfide, where "dialkyl" is mixed dimethyl, diethyl and dibutyl.

EXAMPLE 3: PREPARATION OF REPRESENTATIVE COMPOUND OF GROUP V.

Eighty-one grams of 37 percent aqueous formaldehyde solution is gradually added to a solution of 61 g. ethanolamine in 200 ml. water. The mixture is stirred 1 hour at 50°–60° C. With cooling, 76 g. carbon disulfide is added and the mixture is stirred 2 hours at 40°–50° C. At room temperature the reaction mixture is then rapidly stirred into a solution of 144 g. zinc sulfate heptahydrate in 300 ml. water. The precipitated product is filtered, water-washed and air-dried to give a white powder which is the zinc salt of the reaction of ethanolamine, formaldehyde and carbon disulfide. The product decomposes if heated to 190°–200° C.

EXAMPLE 4: VULCANIZATE EVALUATION.

Blooming

The "I" compounds and the "II" compounds are evaluated alone as accelerators with regard to effect on surface-bloom characteristics in the vulcanization recipe previously described, and compared to mixed accelerator compositions wherein each I-compound is separately blended with the II-compound in proportions of 25 – 75 percent and 50 – 50 percent. In a series of tests, the recipes are adjusted so that 2, 3 or 4 phr of accelerator is used in conjunction with 2 phr sulfur; and 3,4 or 5 phr accelerator is used with 0.5 phr sulfur. The "-bloom" evaluations are made in these tests 3 months after curing of the vulcanizates; results are reported in Table No. 1. It is observed that the amount of surface bloom on the cured rubber when the mixed accelerators compositions are used generally ranges from none to light oil film or light crystal coating. However, when the individual accelerator compounds are employed alone in the recipe, the bloom of the rubber is significantly greater than that of rubber using corresponding concentrations of the mixed accelerator compositions, and heavy oil films and heavy crystal coatings are often observed on these "single accelerator" vulcanizates.

Accelerator Activity

The relative accelerators activities in vulcanizates prepared using the accelerators and combinations thereof as above-described is determined by measuring the tensile strengths and 200 percent modulus of the cured elastomers prepared from recipes using 2 phr. accelerator with 2 phr. sulfur, and 4 phr. accelerator with 0.5 phr. sulfur. At equivalent concentrations of ingredients, it is found that vulcanizates wherein the accelerator is the combination of components as claimed have significantly higher activities than when the individual components are used alone in the recipe. This is shown by markedly higher modulus values and tensile strengths of the vulcanizates, for example, as shown in Tables 2 and 3.

EXAMPLE 5

The foregoing tests and evaluations are carried out for other combinations of accelerators embodied within the invention and results compared to those obtained using the individual accelerator components alone. The results show marked decrease in surface bloom and significant increase in activity for the accelerator combination compositions of the invention. Comparisons are made with vulcanization recipes containing 2 phr accelerator with 2 phr sulfur, and 4 phr. accelerator with 0.5 phr. sulfur for the following accelerators wherein the group designation (Roman numerals) previously applied thereto is in parentheses.

Accelerator Composition a. 25% of thiourea (I) of Example 1 (A) and 75% of tetramethyl thiuram disulfide (III) } test No. 21 of Table 1 b. 25% and 50% of thiourea (I) of Example 1 (A) and 75% and 50%, respectively, of polysulfide (II) of Example 2 } test 15 of Table 1 and test 9 of Table 2 c. 25% of thiourea (I) of Example 1 (C) and 75% of zinc O,O-dibutyl phosphorodithioate (IV) } test 26 of Table 1 and test 8 of Table 2 d. 25% and 50% of thiourea (I) of Example 1 (C) and 75% and 50%, respectively, of a 3:1 mixture of bis(N,N-oxydiethylene)-thiuram disulfide and tetramethyl thiuram disulfide (III) } tests 22 and 23 of Table 1 and test 5 of Table 3 e. 25% of 1,3-bis[(diethylthiocarbamyl)-thiomethyl] thiourea (I) and 75% of bis [(dibutylthiocarbamyl)-thiomethyl] disulfide (II) } test 19 of Table 1 and test 6 of Table 3 f. 25% of thiourea (I) of Example 1 (D) and 75% of polysulfide (II) of Example 2 } test 28 of Table 1 g. 50% of thiourea (I) of Example 1 (A) and 50% of zinc salt (Example 3) of reaction product of ethanolamine, formaldehyde and carbon disulfide (V) } test 27 of Table 1 and test 7 of Table 2 h. the compositions set forth as tests 14, 16, 17, 18 and 20 of Table 1.

i. the compositions set forth as tests 10 and 11 of Table 2.

EXAMPLE 6

In order to demonstrate the specificity and uniqueness of the accelerator compositions of this invention, various combinations of accelerators containing at least one compound from the essential groups I – V and another accelerator of similar but different structure from those claimed are tested as in the preceding example and the results compared to those obtained using the individual accelerator components alone. It is found that the following accelerator compositions give no improvement in reducing surface bloom of the cured rubbers, nor in increasing accelerator activity.

(a) 50% of thiourea (I) of Example 1 (C) and 50% of polysulfide of the structure $$R_2N\overset{S}{\overset{\|}{C}}SS\overset{S}{\overset{\|}{C}}NR_2 \text{ where } R_2 \text{ is mixed dimethyl and diethyl.}$$

} Test 24 of Table 1.

(b) 33% of thiourea (I) of Example 1 (C) and 67% of polysulfide of Test (a). } Test 25 of Table 1, and Test 8 of Table 3.

(c) 75% of polysulfide (II) of Example 2, and 25% of thiourea of the structure $$(C_4H_9)NH\overset{S}{\overset{\|}{C}}NH)C_4H_9)$$

} Test 29 of Table 1, and Test 12 of Table 2.

(d) 75% of polysulfide (II) of Example 2, and 25% of 3:2 mixture of thiourea of the structure $$(C_4H_9)NH\overset{S}{\overset{\|}{C}}NH(C_4H_9) \text{ and the thiourea of the structure}$$

$$(C_2H_5)NH\overset{S}{\overset{\|}{C}}NH(C_2H_5)$$

} Test 30 of Table 1, and Test 13 of Table 2.

TABLE I

| Test Number | Accelerator | Bloom on EPDM vulcanizate 2 phr. accelerator, 2 phr. sulfur. | 4 phr. accel. 0.5 phr. S. |
|---|---|---|---|
| 1 | See Example 1-A | None | Heavy. |
| 2 | See Example 1-B | do | Medium. |
| 3 | See Example 1-C | do | Do. |
| 4 | [(C₂H₅)₂NC(S)SCH₂NH]₂C(S) | Light | Do. |
| 5 | See Example 1-D | None | Do. |
| 6 | See Example 2 | do | Heavy. |
| 7 | [(C₂H₅)₂NC(S)SCH₂S]₂ | do | Do. |
| 8 | [C₄H₉)₂NC(S)SCH₂S]₂ | Light | Light. |
| 9 | [(CH₃)₂NC(S)S]₂ | Heavy | Heavy. |
| 10 | 1 part of No. 9 plus 3 parts of [O(CH₂CH₂)₂NC(S)S]₂. | Light | Do. |
| 11 | 3 parts of No. 9 plus 1 part of [C₂H₅)₂NC(S)S]₂. | Heavy | Do. |
| 12 | [(C₄H₉O)₂P(S)S]₂Zn | Light | Medium. |
| 13 | See Example 3 | do | Light. |
| 14 | 1 part of No. 1 plus 1 part of No. 6 | None | None. |
| 15 | 1 part of No. 1 plus 3 parts of No. 6 | do | Do. |
| 16 | 1 part of No. 2 plus 3 parts of No. 6 | do | Do. |
| 17 | 1 part of No. 3 plus 1 part of No. 6 | do | Do. |
| 18 | 1 part of No. 3 plus 3 parts of No. 6 | do | Do. |
| 19 | 1 part of No. 4 plus 3 parts of No. 8 | do | Do. |
| 20 | 1 part of No. 1 plus 3 parts of No. 7 | do | Do. |
| 21 | 1 part of No. 1 plus 3 parts of No. 9 | do | Do. |
| 22 | 1 part of No. 3 plus 1 part of No. 10. | do |  |
| 23 | 1 part of No. 3 plus 3 parts of No. 10. |  | Light. |
| 24 | 1 part of No. 3 plus 1 part of No. 11. |  | Heavy. |
| 25 | 1 part of No. 3 plus 2 parts of No. 11. | Medium-heavy. | Do. |
| 26 | 1 part of No. 3 plus 3 parts of No. 12. | None | None. |
| 27 | 1 part of No. 1 plus 1 part of No. 13. | do | Do. |
| 28 | 1 part of No. 5 plus 3 parts of No. 6 | do | Do. |
| 29 | 3 parts of No. 6 plus 1 part of (C₄H₉NH)₂C(S). | Heavy | Heavy. |
| 30 | 3 parts of No. 6 plus 0.5 part of (C₂H₅NH)₂C(S) and 0.5 part of (C₄H₉NH)₂C(S). | do | Do. |

TABLE 2

| | | Vulcanizate; accel.-4 phr.; sulfur-0.5 phr. | | | | | |
|---|---|---|---|---|---|---|---|
| | | Tensile (p.s.i.) at cure time of— | | | Modulus, 200% (p.s.i.) at cure time of— | | |
| Test No. | Accelerator | 10 min. | 20 min. | 40 min. | 10 min. | 20 min. | 40 min. |
| 1 | See Example 1-C | 1,230 | 1,480 | 1,610 | 430 | 550 | 620 |
| 2 | See Example 1-A | 1,250 | 1,650 | 1,860 | 450 | 550 | 640 |
| 3 | See Example 1-B | 750 | 1,430 | 1,700 | 350 | 580 | 660 |
| 4 | See Example 2 | 1,100 | 1,650 | 1,750 | 450 | 660 | 690 |
| 5 | [(C₄H₉O₂P(S)S]₂Zn | 950 | 1,500 | 1,750 | | | |
| 6 | See Example 3 | 1,300 | 1,600 | 1,620 | 600 | 700 | 710 |

TABLE 2—Continued

| Test No. | Accelerator | Vulcanizate; accel.-4 phr.; sulfur-0.5 phr. | | | | | |
|---|---|---|---|---|---|---|---|
| | | Tensile (p.s.i.) at cure time of— | | | Modulus, 200% (p.s.i.) at cure time of— | | |
| | | 10 min. | 20 min. | 40 min. | 10 min. | 20 min. | 40 min. |
| 7 | 1 part of No. 6 and 1 part of No. 2 | 1,860 | 2,020 | 1,960 | 740 | 825 | 800 |
| 8 | 3 parts of No. 5 and 1 part of No. 1 | 1,300 | 1,700 | 1,800 | | | |
| 9 | 1 part of No. 2 and 1 part of No. 4 | 1,430 | 1,830 | 1,910 | 500 | 660 | 700 |
| 10 | 1 part of No. 3 and 1 part of No. 4 | 1,420 | 1,750 | 1,960 | 500 | 580 | 680 |
| 11 | 1 part of No. 1 and 3 parts of No. 4 | 1,570 | 1,950 | 2,060 | 640 | 730 | 840 |
| 12 | 3 parts of No. 4 and 1 part of $(C_4H_9NH)_2C(S)$ | 960 | 1,570 | 1,640 | 400 | 540 | 550 |
| 13 | 3 parts of No. 4, 0.5 part of $(C_4H_9NH)_2C(S)$, and 0.5 part of $(C_2H_5NH)_2C(S)$ | 890 | 1,550 | 1,650 | 350 | 520 | 550 |

TABLE 3

| Test number | Accelerator | Vulcanizate; accel.-2 phr.; sulfur-2 phr. | | | | | |
|---|---|---|---|---|---|---|---|
| | | Tensile (p.s.i.) at cure time of— | | | Modulus, 200% (p.s.i.) at cure time of— | | |
| | | 10 min. | 20 min. | 40 min. | 10 min. | 20 min. | 40 min. |
| 1 | See Example 1-C | 2,020 | 2,560 | 2,750 | 750 | 1,050 | 1,340 |
| 2 | $[(C_2H_5)_2NC(S)CH_2NH]_2C(S)$ | 2,250 | 2,500 | | | | |
| 3 |  | 2,025 | 2,400 | | 825 | | 1,175 |
| 4 | 3 parts of $[O(CH_2CH_2)_2NC(S)S\text{—}]_2$ and 1 part of $[(CH_3)_2NC(S)S\text{—}]_2$ | 1,220 | 2,150 | 2,500 | 450 | 750 | 1,150 |
| 5 | 1 part of No. 4 and 1 part of No. 1 | 2,070 | 2,710 | 2,730 | 770 | 1,250 | 1,470 |
| 6 | 1 part of No. 2 and 3 parts of No. 3 | 2,240 | 2,600 | | | 900 | 1,250 |
| 7 | 3 parts of $[(CH_3)_2NC(S)S\text{—}]_2$ and 1 part of $[(C_2H_5)_2NC(S)S\text{—}]_2$ | 2,180 | 2,640 | 2,770 | 870 | 1,350 | 1,540 |
| 8 | 2 parts of No. 7 and 1 part of No. 1 | 2,150 | 2,550 | 2,725 | 850 | 1,250 | 1,560 |

We claim:

1. A surface bloom-inhibiting vulcanization accelerator composition comprising a mixture of from about 25 to about 75 weight percent of
   I. a thiourea of the structure

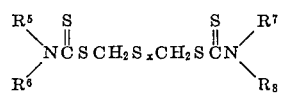

and correspondingly from about 75 to 25 weight percent of a sulfur-containing compound selected from the group consisting of:
   II. A polysulfide of the structure $$\underset{R^6}{\overset{R^5}{N}}\text{—}C(S)\text{—}CH_2S_xCH_2\text{—}C(S)\text{—}\underset{R^8}{\overset{R^7}{N}}$$

III. tetramethyl thiuram disulfide, or a mixture of tetramethyl thiuram disulfide and bis(oxydiethylene)thiuram disulfide containing at least about 25 percent by weight of tetramethyl thiuram disulfide;
   IV. a zinc phosphorodithioate of the structure

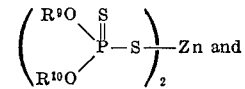

V. the zinc salt of the reaction product of essentially equimolar amounts of ethanolamine, formaldehyde and carbon disulfide; where in the above structures $R^1$, $R^2$, $R^3$ and $R^4$ are alkyl having one to eight carbon atoms or phenyl, $R^5$ and $R^7$ are alkyl having one to eight carbon atoms or phenyl, $R^6$ and $R^8$ are alkyl having one to eight carbon atoms, and each of $R^5$, $R^6$, $R^7$ and $R^8$ taken together with the nitrogen atom to which they are attached can form a piperidino, pyrrolidino or morpholine radical, $R^9$ and $R^{10}$ are alkyl having one to eight carbon atoms, and $x$ is an integer of 2 to 6.

2. The composition according to claim 1 where component I is 25 to 50 percent of the mixture.

3. The composition according to claim 1 where $R^1$, $R^2$, $R^3$, $R^4$, $R^5$, $R^6$, $R^7$ and $R^8$ are alkyl of one to four carbon atoms, and $R^9$ and $R^{10}$ are alkyl of three to five carbon atoms.

4. The composition according to claim 3 wherein the integer $x$ (structure II) is 2.

5. The composition according to claim 3 where $R^9$ and $R^{10}$ are butyl.

* * * * *